Nov. 19, 1957     J. K. ASLIN ET AL     2,813,285
AXIAL SCRAPING DEVICE FOR PIPE CLEANING

Filed March 1, 1954     2 Sheets-Sheet 1

INVENTORS.
James Kenneth Aslin
Adron Willis Brown
Howard R. Downey

BY Everett A. Johnson
ATTORNEY

Nov. 19, 1957  J. K. ASLIN ET AL  2,813,285
AXIAL SCRAPING DEVICE FOR PIPE CLEANING
Filed March 1, 1954  2 Sheets-Sheet 2
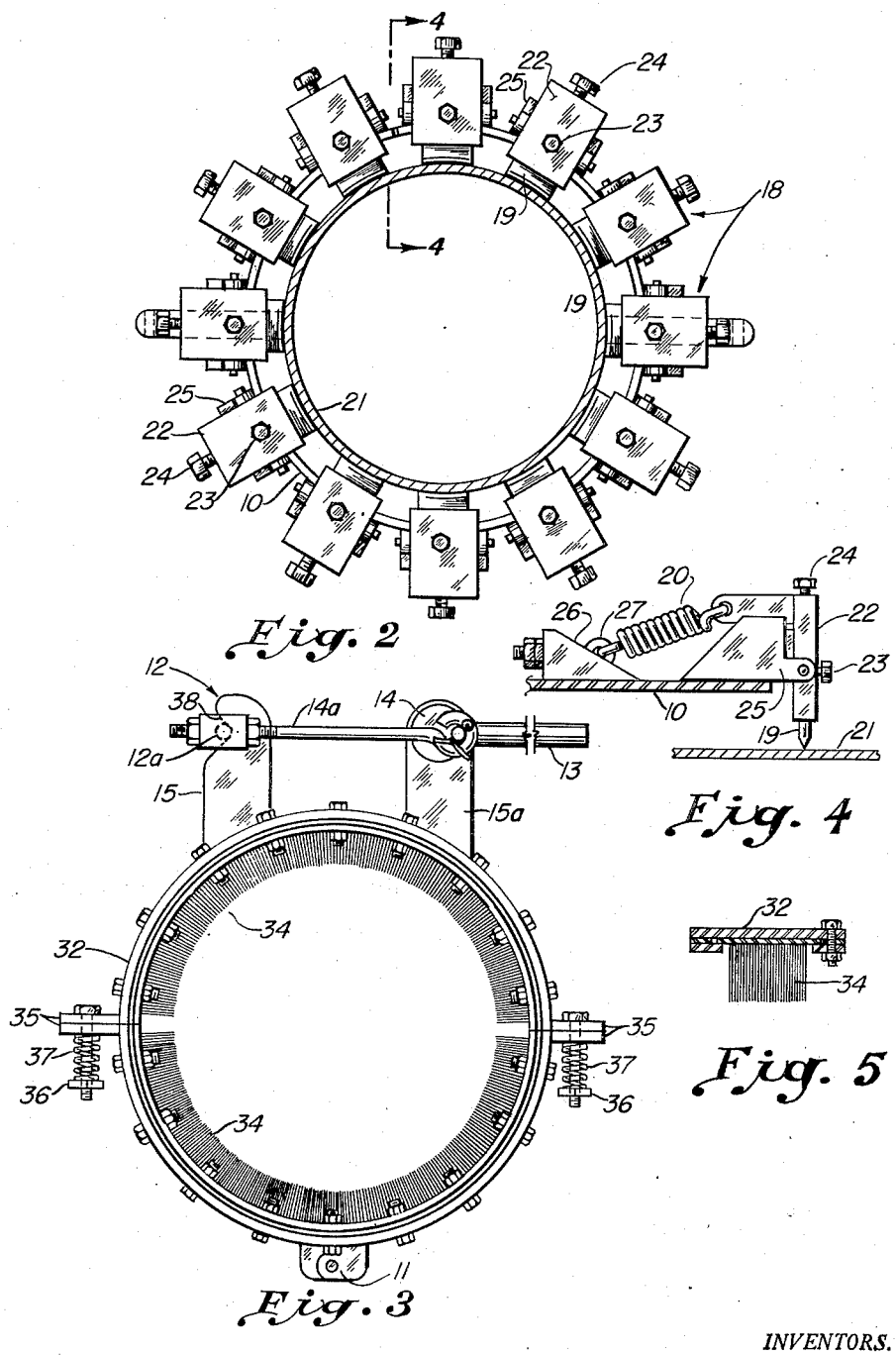
INVENTORS.
James Kenneth Aslin
Adron Willis Brown
Howard R. Downey
BY
Everett A. Johnson
ATTORNEY

United States Patent Office 2,813,285
Patented Nov. 19, 1957

2,813,285

AXIAL SCRAPING DEVICE FOR PIPE CLEANING

James Kenneth Aslin, North Platte, Adron Willis Brown, Bridgeport, and Howard R. Downey, North Platte, Nebr.

Application March 1, 1954, Serial No. 412,994

3 Claims. (Cl. 15—104.04)

This invention relates to an improved apparatus for cleaning the exterior surface of a pipe line.

In the maintenance of buried pipe lines, it is frequently necessary to uncover sections of the pipe where soil corrosion of the pipe has taken place. The exterior surface of the pipe must be thoroughly cleaned to remove earth, rust, pipe coatings and other accumulations so that the pipe surface is exposed for inspection and repair of the corrosion pits and other defects. These pits and defects are repaired by arc welding which fills the pits flush with the pipe surface which prevents further deterioration and leaks.

Prior to our invention, it was common practice to clean the surface of the pipe with hand tools by a chipping and scraping operation. This was a slow and costly operation and in cleaning the bottom surface of the pipe line the working conditions and hazards were great.

Accordingly, it is an object of our invention to provide a new and improved portable apparatus for cleaning exposed sections of a pipe line in place. It is another object of our invention to provide a pipe cleaning apparatus adapted to strip the coating from pipe lines in reconditioning operations in an expeditious and inexpensive manner. A further object of our invention is to provide an apparatus which may be drawn axially along exposed sections of pipe line to thoroughly clean the entire surface of the line. These and other objects of our invention will become apparent as the decsription of our invention proceeds.

Briefly, the apparatus comprises a divided cylindrical head supporting a multiplicity of radially projecting cutter elements whose inner ends are pointed for contact with the pipe surface. The apparatus includes spring means for holding the cutter elements yieldingly against the surface of the pipe and for maintaining the cutter means at right angles with respect to the surface of the pipe line. The cutter unit comprises two rows of offset cutters and is pulled along the line by a truck winch or other drawing power. In tandem with the scraper is a brush-containing pipe cleaner which is attached to the scraping assembly by short lengths of chain. The brush assembly sweeps away any remaining coating or scale to provide a thoroughly cleaned pipe surface.

Our invention will be described with reference to a particular embodiment thereof illustrated in the accompanying drawings and wherein:

Figure 2 is an end view of the apparatus showing the radial cutter holders;

Figure 3 is an end view of the brush holder frame and brush;

Figure 4 is a fragmentary side view of the cutter means viewed along the line 4—4 of Figure 2; and Figure 5 is a cross-sectional view of the brush segment taken along the line 5—5 in Figure 1.

Figure 1:
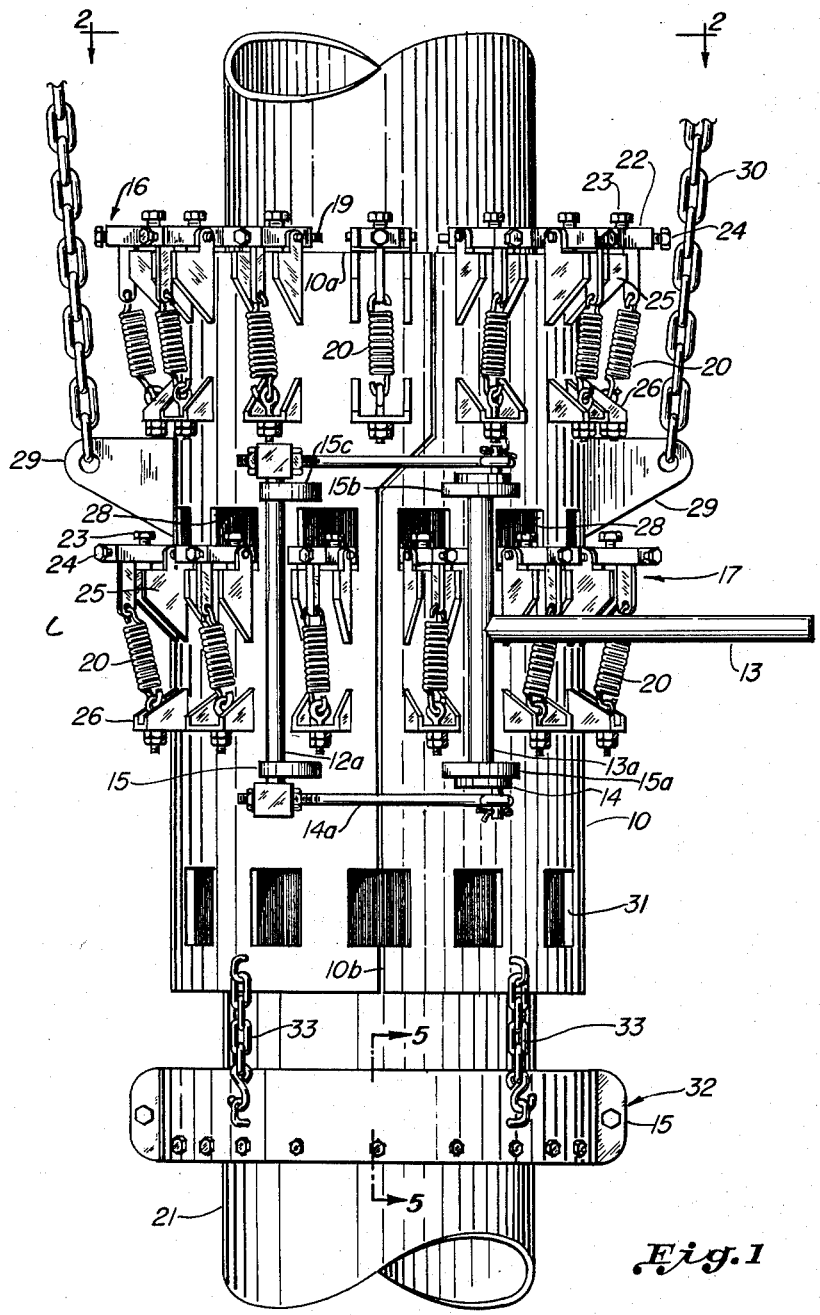
Figure 1 is a plan view of the apparatus in operative position about a section of pipe.

Referring to Figure 1, the main frame of the pipe cleaning apparatus comprises a split tube or cylinder 10 composed of two semi-circular segments each comprising 180° and provided with a hinge 11 and a latch means 12. The latch 12 comprises a lever 13, a lever rod 13a, a pair of cam means 14, link rods 14a, and the supporting brackets 15, 15a, 15b and 15c. The bar 12a is adjustably fixed to the threaded ends of link rods 14a and positioned in keeper notch means 38 of brackets 15 and 15c. The cam means 14 on shaft 13a pivotally engage the ends of link rods 14a and after the locking rod 12a is positioned in notch 38, the lever 13 is depressed or rotated thereby rotating shaft 13a and cam means 14 to draw the locking rod 12a into the keeper notch 38 as shown in Figure 3.

The length of the tubular frame 10 is sufficient to accommodate two sets or arrays 16 and 17 of individual cutters 18. Each set 16 and 17 is axially spaced from the other and the individual cutters 18 in each set are circumferentially radially spaced from each adjacent cutter. The blades 19 contact the surface of the pipe under tension of springs 20 and the combined action of the blades 19 and spring 20 is to center the frame 10 about the pipe 21. The circumferentially spaced cutters 18 in the two sets 16 and 17 are circumferentially offset so that the paths of the blades 19 overlap and scrape the entire surface of the exposed pipe 21 when the apparatus is drawn axially of the pipe.

In more detail, the cutter holder unit 18 comprises an elongated, rectangular box 22 with a lower end opening to accommodate the blade 19 which is held in place by lock screw 23 and adjusting screw 24. The supporting yoke 25 is fixed to the frame 10 and provides an axis and journal for the cutter holder unit 18. A spring anchor 26 is fixed to the frame 10 and the spring 20 provides the tension to maintain the cutter blade 19 at right angles with respect to the surface of the pipe line in normal cleaning operations. However, the spring 20 provides flexibility which allows the cutter holder unit 18 to pivot in yoke 25 when the cutter blade 19 encounters an obstruction on the surface of the pipe 21.

Each of the cutters means 18 comprises the elements illustrated in Figure 4 with the cutter box 22 and cutter blades 19 extending beyond the leading edge 10a of the frame 10 in the case of the first cutter set 16, whereas the cutter blades 19 of set 17 extend through openings 28 in the tubular frame 10 as shown in Figure 1.

The device is placed about pipe 21 with hinge 11 below the pipe and latch 12 is closed by lowering handle 13. The illustrated blade 19 retracts to pass over obstructions but when the blades 19 comprise rigid forwardly inclined tabs cut on three sides and deflected inwardly on the remaining side to form openings 28 and 31, the device can be loosened as described below.

A winch or other machine (not shown) may be used to propel the apparatus along the pipe line. For this purpose spaced brackets or lugs 29 fixed to the frame 10 are provided for attaching pull chains 30.

The cleaning device is drawn over the surface of the pipe at a speed of about 2.5 miles per hour and the cutter blades 19 rake the surface of the pipe 21 removing rust, scale, pipe coatings and other accumulations which are discharged in front of the frame 10 or through the openings 28. Additional discharge openings 31 near the trailing end of the main frame 10 also discharge accumulations which are removed from the pipe surface.

A brush cleaner, in the form of a split ring 32, is attached to the main frame 10 by chains 33. The brush cleaner 32 includes wire brush segments 34 which are supported within the ring 32 and contact the scraped surface of the pipe to further aid in the cleaning. The arrangement of such brushes 34 is shown in Figures 3 and 5.

When the cleaner comes to a collar or weld, one man easily loosens the device by lifting the handle 13 of the latch 12 thereby permitting the semi-cylindrical segments of the frame 10 to be rotated about hinge 11. After the device passes over the obstruction, the operator pushes down on the handle 13 and the pipe cleaner moves along in its scraping and brushing operation.

With further reference to the brush assembly, the two segments of the split ring 32 are bolted together through adjacent lugs 35. Between each nut 36 and the opposing lug 35, we may provide a coil spring 37. Accordingly, the brush assembly is expansible to a degree sufficient to permit passing the unit over normal obstructions encountered in the cleaning operation.

Although we have described our invention with reference to a certain embodiment thereof in more or less detail, it should be understood that this is by way of illustration only and not by way of limitation. The pipe cleaning and brushing apparatus as shown is mounted for axial travel along a fixed pipe, but the features of the apparatus may be incorporated into a stationary type of cleaner wherein lengths of pipe are drawn through the cleaner. Thus, it is contemplated that various mechanical equivalents functioning in the manner of the structures described can be used in our invention without departing from the spirit thereof.

What we claim is:

1. In a pipe cleaning apparatus comprising a plurality of longitudinal sectors of a hollow cylinder yieldably joined circumferentially to form a hollow frame to be disconnectably disposed about a pipe, a plurality of cutter head assemblies mounted on said frame, each of said cutter head assemblies including an elongated cutter blade, a yoke fixed to said frame pivotally supporting said blade for rotation about a transverse axis spaced from but substantially perpendicular to the longitudinal axis of said frame, resilient means anchored at one end to said frame and at the other end to said cutter blade, said resilient means being pretensioned to resist rotation of said cutter blade about said transverse axis as said cutter blade is moved along the surface of said pipe, and abutment means to limit rotation of said cutter blade about said transverse axis due to said pretensioned resilient means and to hold said cutter blade substantially perpendicular to said longitudinal axis.

2. An apparatus for cleaning the surface of a pipe comprising a cylindrical frame, a plurality of elongated cutter blades spaced around said frame for contact with said pipe, a plurality of yokes fixed to said frame, each of said yokes pivotally supporting one of said cutter blades for rotation about a transverse axis spaced from but substantially perpendicular to the longitudinal axis of said frame, resilient means each anchored at one end to said frame and at the other end to one of said cutter blades, said resilient means being pretensioned to resist rotation of each of said cutter blades about said transverse axis as said apparatus is moved along said pipe, and abutment means to limit the rotation of each of said cutter blades about said transverse axis due to said pretensioned resilient means and to hold said cutter blades in cutting engagement with said surface of said pipe.

3. A pipe cleaning machine comprising a supporting frame which includes a pair of semi-cylindrical sectors of a hollow cylinder, hinge means connecting said sectors together along longitudinal edges, latch means for securing said semi-cylindrical sectors together about a pipe to be cleaned, a plurality of circumferentially arrayed cutter head assemblies mounted on said frame, the circumferential arrays being axially spaced along said frame, each of said assemblies including a blade-supporting cutter holder, a blade in said holder, a yoke fixed to said frame pivotally supporting said holder for rotation on a transverse axis substantially perpendicular to the axis of said frame, an adjustable spring means anchored at one end to said frame and at the other to said cutter holder for rotating said cutter holder about said transverse axis in a direction to counteract the rotation of said cutter holder produced by the movement of said pipe cleaning machine along said pipe, and an abutment means fixed to said frame for limiting the rotation of said cutter holder about said transverse axis due to said spring means and for holding said blade in cutting engagement with the surface of said pipe, whereby said blade which is normally in cutting engagement with the surface of said pipe is rotated out of said engagement when said blade encounters an object on said surface which cannot be moved by the force produced by said spring means.

References Cited in the file of this patent

UNITED STATES PATENTS

| 736,053 | Armstrong | Aug. 11, 1903 |
| 1,099,541 | Eek | June 9, 1914 |
| 1,680,372 | Fenn | Aug. 14, 1928 |
| 1,849,201 | Niemann | Mar. 15, 1932 |
| 1,887,853 | Jinnett | Nov. 15, 1932 |
| 1,898,964 | Jinnett | Feb. 21, 1933 |
| 2,691,395 | Yeadon et al. | Oct. 12, 1954 |

FOREIGN PATENTS

| 405,018 | Germany | Oct. 25, 1924 |